(12) United States Patent
Berger

(10) Patent No.: US 6,273,353 B1
(45) Date of Patent: *Aug. 14, 2001

(54) BELT SHORTENING DEVICE WITH L-SHAPED SPINDLE AND IMPROVED GUIDE TABS

(75) Inventor: Russell Berger, Needham, MA (US)

(73) Assignee: Constance F. Berger, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,606

(22) Filed: May 17, 2000

Related U.S. Application Data (63) Continuation-in-part of application No. 09/526,593, filed on Mar. 16, 2000.

(51) Int. Cl.[7] ................................................ B65H 75/38
(52) U.S. Cl. ........................... 242/388.1; 24/68 CD; 24/685 B; 24/909
(58) Field of Search ................................ 242/388, 388.1, 242/388.2, 388.3, 388.4, 388.5, 378.1, 378.2; 24/68 R, 69 R, 70 CT, 70 ST, 69 ST, 71.2, 68 CD, 19; 254/217, 223

(56) References Cited

U.S. PATENT DOCUMENTS

| | | |
|---|---|---|
| 169,770 | 11/1875 | Burnham . |
| 482,035 | 9/1892 | Buckingham . |
| 547,760 | 10/1895 | Bickel . |
| 799,767 | 9/1905 | Weisenborn . |
| 1,606,221 | 11/1926 | Hergesheimer . |
| 1,620,363 | 3/1927 | Larkin . |
| 2,526,216 | 10/1950 | Gartner . |
| 3,574,342 | 4/1971 | Berns . |
| 3,749,366 | 7/1973 | Brucker . |
| 3,826,473 | 7/1974 | Huber . |
| 4,510,652 | 4/1985 | van Iperen .............................. 24/68 |
| 4,604,772 | * 8/1986 | Arff ............................... 24/68 CD X |
| 4,604,773 | 8/1986 | Weber et al. ........................ 24/71.2 |
| 4,823,443 | 4/1989 | Waters .................................... 24/68 |
| 4,860,606 | 8/1989 | Rousseau .............................. 74/157 |
| 4,913,608 | 4/1990 | Royball ................................ 410/103 |
| 4,922,582 | 5/1990 | Flanigan ............................... 24/71.1 |
| 5,103,536 | 4/1992 | Kamper ................................... 24/68 |
| 5,426,827 | 6/1995 | Tracy et al. ............................. 24/68 |
| 5,839,789 | 11/1998 | Koledin ................................ 297/476 |
| 5,845,372 | 12/1998 | Smith et al. ........................... 24/168 |
| 6,047,451 | * 4/2000 | Berger et al. ................. 24/68 CD X |
| 6,105,211 | * 8/2000 | Berger .......................... 24/68 CD X |

FOREIGN PATENT DOCUMENTS 4240450   3/1994   (DE) .

* cited by examiner

*Primary Examiner*—William A. Rivera
(74) *Attorney, Agent, or Firm*—Barlow, Joseph & Holmes (57) ABSTRACT

A belt shortening device for winding and unwinding a vehicle seat belt includes an L-shaped spindle mounted in a frame and connected to a crank arm to facilitate winding. The spindle includes a longitudinally extending slot which communicates with a laterally extending entry opening. A seat belt is insertable, edge first, into the longitudinally extending slot via the laterally extending entry opening. Once the vehicle seat belt is positioned within the longitudinally extending slot, the closure closes the entry opening and the crank arm is manipulated to, thereby, rotate the spindle to wind the belt therearound. The laterally extending entry opening is positioned at one end of the length of the longitudinally extending slot. A guide tab or pair of guide tabs may also be employed to further secure the belt during winding and unwinding.

11 Claims, 8 Drawing Sheets

BELT SHORTENING DEVICE WITH L-SHAPED SPINDLE AND IMPROVED GUIDE TABS

This application is a continuation-in-part of U.S. Ser. No. 09/526,593, filed Mar. 16, 2000.

BACKGROUND OF THE INVENTION

The present invention relates generally to belt shortening devices. More specifically, the present invention relates to devices suitable for shortening seat belt webbing. In addition, the present invention relates to the removal of slack from seat belt webbing retaining a baby seat in place on a supporting vehicle seat.

In the prior art, lengths of belt material or webbing are commonly used to retain a structure in place. For example, belts are frequently used to retain stacked articles in place on a pallet. Belts are also commonly employed in vehicles to secure an occupant for safety purposes. In particular, these existing belts in vehicles are typically used to secure a baby's seat to the supporting vehicle seat. While belts are effective for security, they suffer from the disadvantage of having unwanted slack which decreases the effectiveness of the belt's ability to secure and retain the baby seat in place.

To address the inherent problem of slack in belts for retaining, there have been many attempts in the prior art to reduce or eliminate such slack. For example, ratcheted spindles have been available in the prior art. The belt webbing is typically routed around the spindle and wound about the spindle with the assistance of the ratchet. Further, the ratchet provides additional leverage and locking to enable the belt to be tightened and released as desired. Also, spring clips have been provided to grip excess portions of the belt to thereby shorten the belt.

However, these prior art devices suffer from many disadvantages which makes them undesirable to use. These prior art devices commonly require that a free end of the belt be routed through the device to enable winding of the belt by the device to effectuate shortening. Other devices permanently incorporate the ratchet take-up mechanism directly on the belt itself. Such devices are commonly used on special belt systems for retaining articles on a pallet. As can be understood, the foregoing prior art devices are unsuitable for shortening vehicle seat belts because vehicle seat belts are not capable of being routed onto a ratchet take-up mechanism due to the presence of bulky buckles, both male and female, present on the free ends of the belts.

In view of the foregoing, there is a demand for a belt shortening device which is well suited for shortening vehicle seat belts. There is a particular demand for a belt shortening device that can be easily retrofitted to an installed baby seat without disengaging the existing belt connection. In addition, there is a demand for a belt shortening device that is compact, inexpensive and easy to operate.

SUMMARY OF THE INVENTION

The present invention preserves the advantages of prior art belt shortening devices. In addition, it provides new advantages not found in currently available devices and overcomes many disadvantages of such currently available devices.

The invention is generally directed to a novel and unique belt shortening device that can be easily mounted to an existing belt without detaching the belt from its existing connection. The device includes an L-shaped spindle rotatably mounted in a frame and connected to a crank arm to facilitate winding. The spindle includes a longitudinally extending slot which communicates with a laterally extending entry opening. A spring-biased closure is connected to the spindle to close the laterally extending entry opening during winding. When the closure is open and access to the laterally extending entry opening is available, a seat belt is insertable, edge first, into the longitudinally extending slot via the laterally extending entry opening. Once the vehicle seat belt is positioned within the longitudinally extending slot, the closure closes the entry opening and the crank arm is manipulated to, thereby, rotate the spindle to wind the belt therearound. The laterally extending entry opening is positioned at one end of the length of the longitudinally extending slot. A securing tab or pair of tabs may also be employed to secure the belt during winding and unwinding.

For installation and operation, the belt to be shortening is slid, edge first, into the device of the present invention. Such a belt, for example, may be employed to secure a baby seat to a vehicle seat. The belt webbing is inserted into the slot of the device with the entire width of the belt residing completely within the spindle of the device. The belt is threaded into the rotating spindle via the entry opening after first exposing the entry opening by opening the spring-biased closure. The belt is also routed below the guide tabs which are spaced apart from the spindle. The handle of the ratchet mechanism is repeatedly pulled by the user to rotate the spindle and, thus, rotate the spindle which contains the belt. Rotation of the spindle causes the belt to be wound about the spindle reducing the overall length of the belt.

When the desired tension is achieved, pulling of the handle is stopped thus ceasing any further winding of the belt webbing. The ratchet mechanism is provided with a suitable locking device to prevent unwinding of the belt from the spindle. In addition, a lock release is provided to permit the belt to be unwound from the spindle, such as for when removal of the device from the belt is desired. Once the belt is completely unwound, the device can be easily removed.

It is therefore an object of the present invention to provide a device that can shorten a belt such as a seat belt.

It is an object of the present invention to provide a belt shortening device suitable for shortening a seat belt retaining a baby seat in place on a vehicle seat.

It is a further object of the present invention to provide a belt shortening device that can be easily retrofitted to an existing belt web without detaching the belt from its existing connection.

Another object of the present invention is to provide a belt shortening device that requires no additional belt webbing or additional buckles.

It is a further object of the present invention to provide a belt shortening device that is inexpensive to manufacture.

Another object of present invention is to provide a belt shortening device that is easy to install and operate.

Another object of the present invention is to provide a belt shortening device that is compact and portable.

A further object of the present invention is to provide a belt shortening device that can remove undesirable and unsafe slack present in a seat belt that is securing a baby seat to a vehicle seat.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
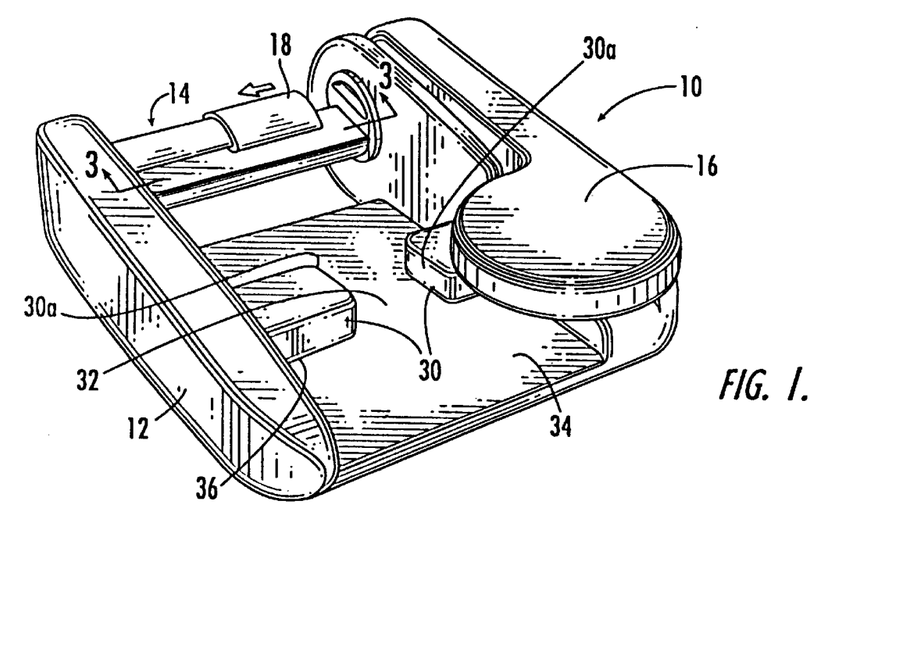
FIG. 1 is a perspective view of the belt shortening device of the present invention with spindle closure in an open position.
Figure 2:
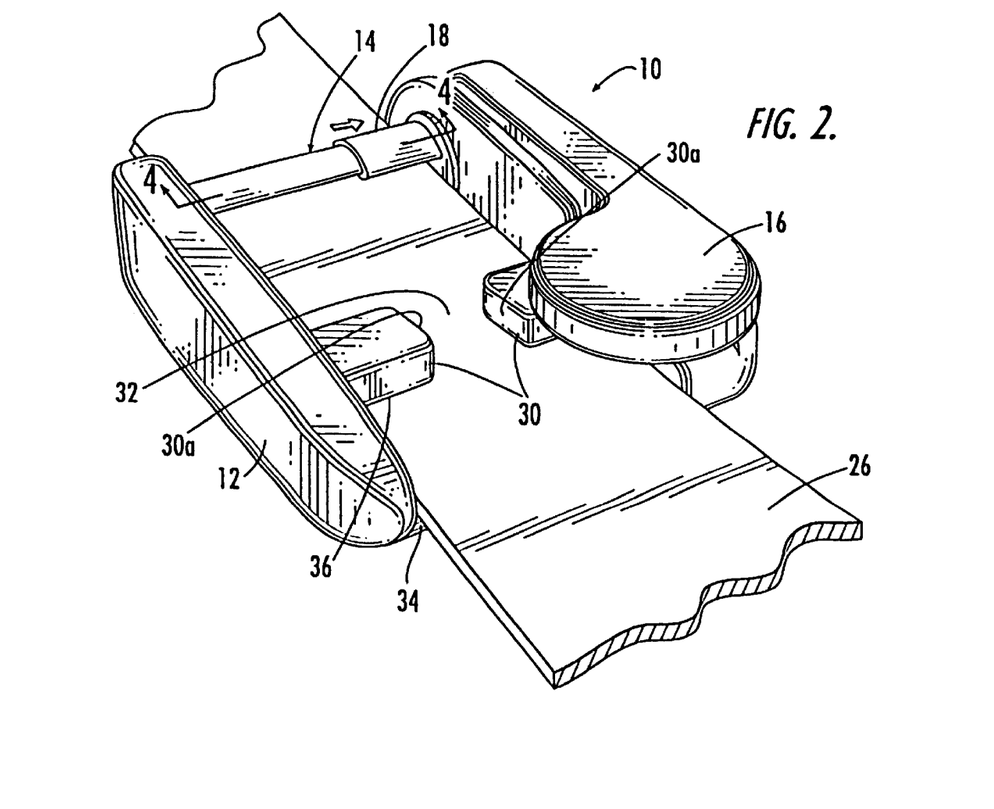
FIG. 2 is a perspective view of the belt shortening device of FIG. 1 with a belt residing therein and the spindle closure in a closed position.
Figure 3:
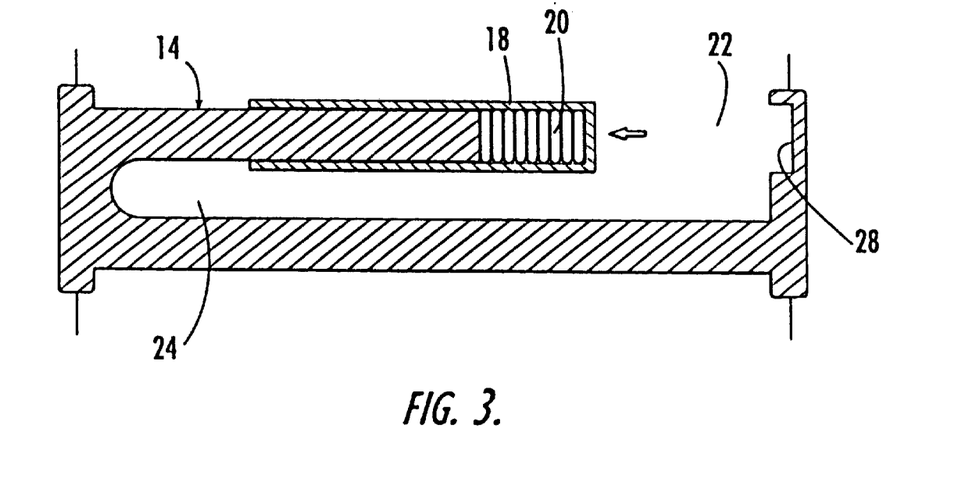
FIG. 3 is a cross-sectional view through the line 3—3 of FIG. 1.
Figure 4:
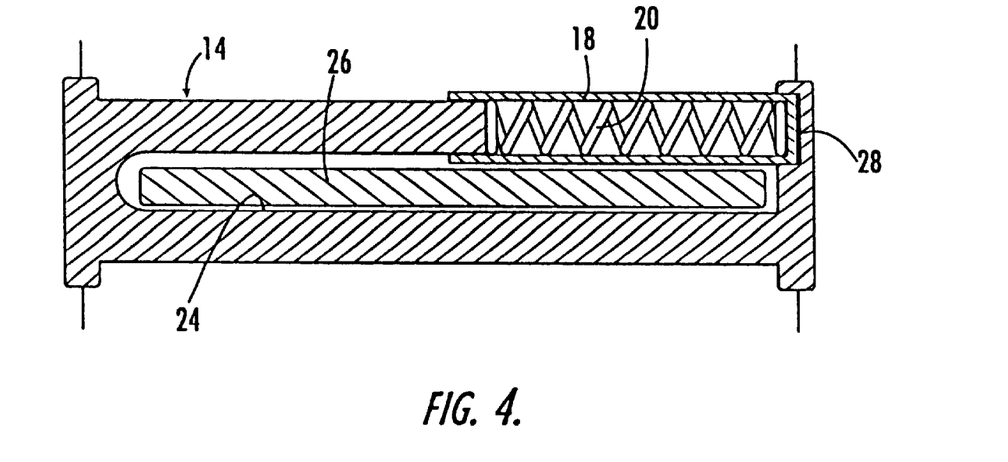
FIG. 4 is a cross-sectional view through the line 4—4 of FIG. 2.

Referring first to FIG. 1, a perspective view of the belt shortening device 10 of the present invention is shown. The device 10 includes a frame 12 which supports a rotatable spindle 14. Rotation of the spindle 14 is controlled by a crank handle 16. Details of the control of the rotation of the spindle 14 will be discussed in more detail below. The spindle 14 is of a substantially L-shaped configuration with a retractable closure 18. Preferably, the closure 18 is spring-biased into a closed position as shown in FIGS. 2 and 4. Referring to FIGS. 1 and 3, the closure 18 is a spring-biased member which may be a cap affixed to the free end of the top portion of the spindle 14. The closure 18 is opened, against the forces of a spring 20, to thereby allow access to an entry opening 22 which, in turn, provides access to a longitudinal slot 24 which houses a belt 26 for shortening. It is also possible to omit the spring-biasing of the closure 18, however, this would require the user to manually return the closure 18 to a closed position.

When the closure 18 is in an open position, a belt 26 may be inserted, edge first, into the longitudinal slot 24 via the entry opening 22. As shown in FIG. 2, the closure 18 is then released to secure the belt 26 within the spindle 14. When the closure 18 is in a closed position, it preferably rests in a seat 28 to add integrity to the spindle 14. Also, for further protection of the belt 26 during the winding process, an additional guide tab or guide tabs 30 may be provided. In FIGS. 2, by way of example, a pair of guide tabs 30, which emanate from opposing sides of the frame 12, are provided. In this embodiment, a central opening 32 is provided to allow access by the belt 26 by folding the belt 26 in half and inserting the belt 26, edges first, therein. These guide tabs 30 are located above the floor 34 of the frame 12 a selected distance to form and define a longitudinal guide track 36. The free ends 30a of the guide tabs 30 are separated from one another to define the lateral entry opening 32 to access the guide track 36 between the tabs 30 and the floor 34 of the frame 12. Essentially, the spindle 14 forms an "L-slot" that is rotatable to wind up the belt 26 residing therein. As shown in FIG. 2, a "T-slot" is provided that is stationery to serve as a guide to control and secure the belt 26 during winding. In FIG. 2, the belt 26 is routed into the "L-slot" of spindle 14 and the stationery "T-slot". Once the belt 26 is loaded, as in FIG. 2, it is in preparation for winding.

Figure 5:
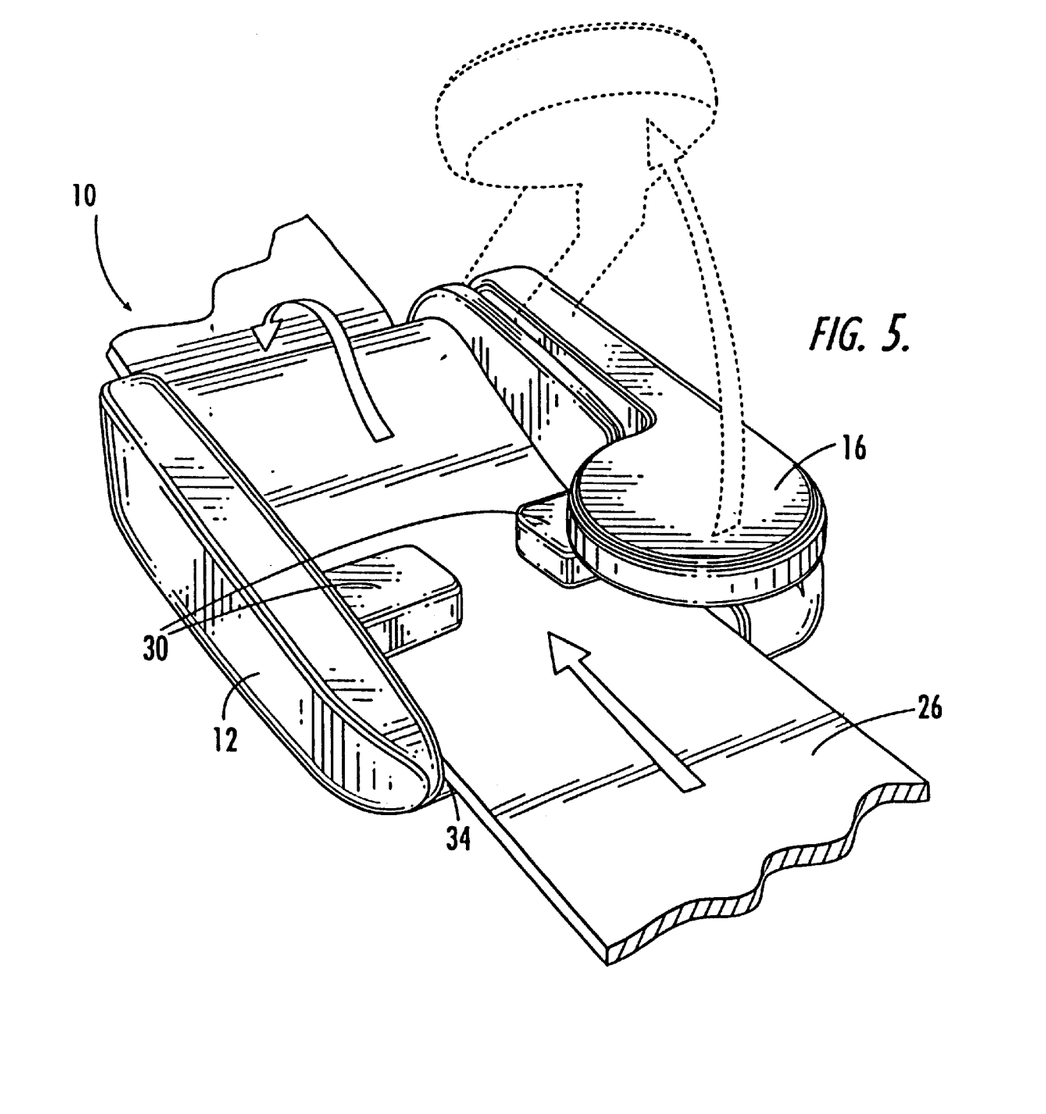
FIG. 5 is a perspective view of the belt shortening device of FIG. 1 in the process of winding a belt for shortening the length thereof.
Figure 6:
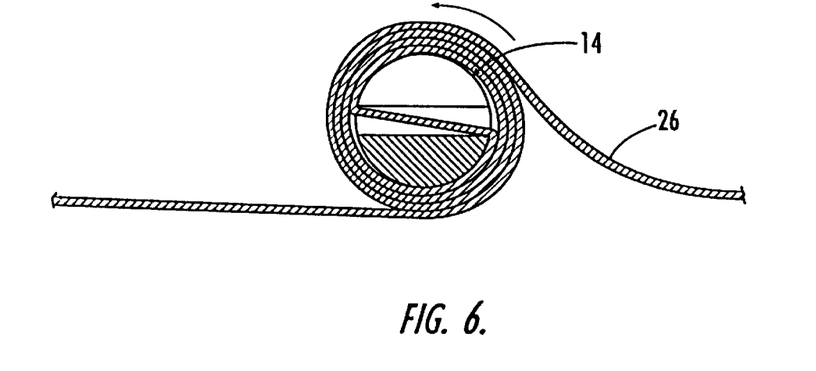
FIG. 6 is a cross-sectional view of the spindle shown in FIG. 5 with the belt being wrapped therearound.

Turning now to FIG. 5, winding and shortening of the belt 26 is shown. Cranking of the handle 16 in an upward direction, as shown by the arrow in dotted lines, causes the spindle 14 (now hidden by wound belt) to rotate thus winding the belt 26 therearound. As shown by the indicated arrows, the belt 26 is shortened and wound about the spindle 14. As the belt 26 is wound about the spindle 14, the belt has a tendency to lift out of the frame 12. With the additional guide tabs 30 of the present invention, the belt 26 is maintained within the frame 12 and proximal to the floor 34 of the frame 12. As a result, during winding, the belt 26 is maintained in control at all times to effectively avoid derailing and jamming of the device 10. FIG. 6 illustrates a cross-sectional view of the belt 26 being wound about the spindle 14.

Figure 7:
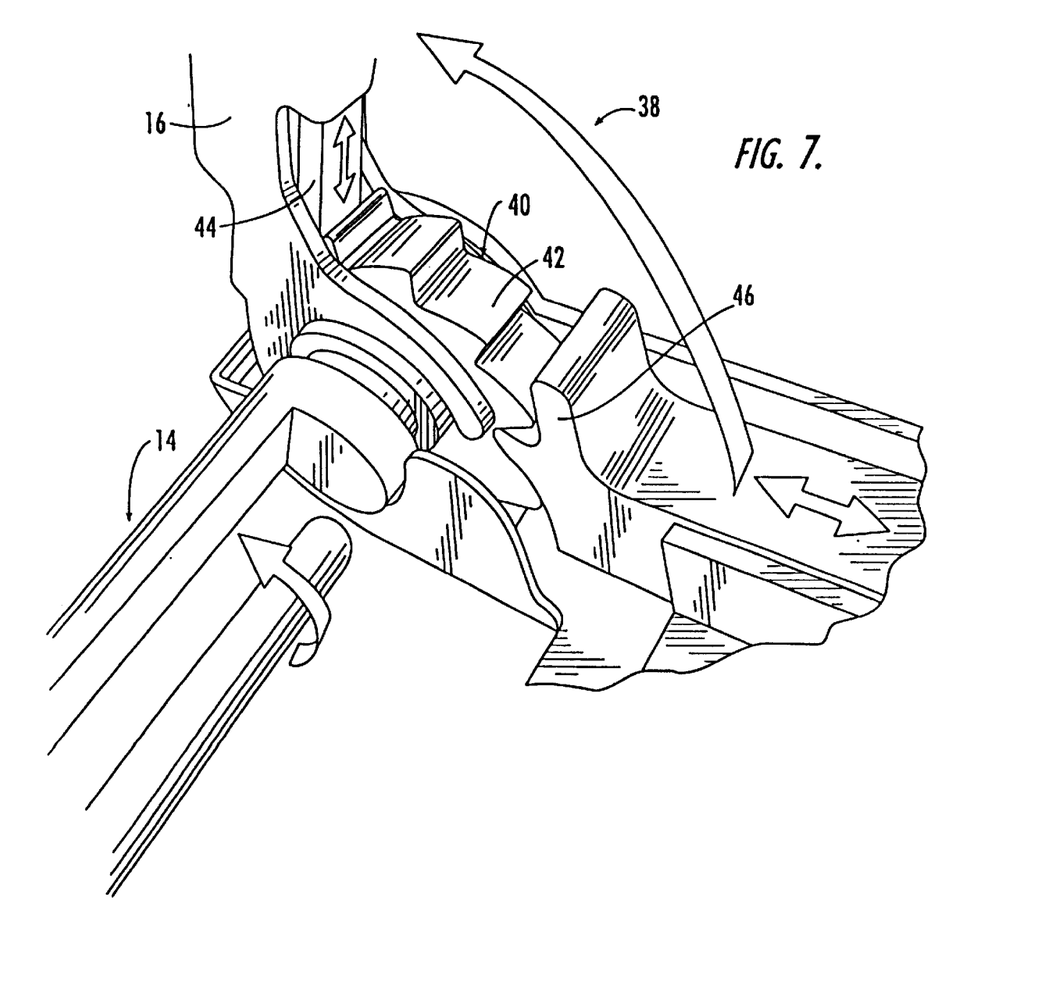
FIG. 7 is a perspective view of the preferred ratchet mechanism for controlling the rotation of the spindle showing an first alternative spindle with no closure.

Referring now to FIG. 7, the ratchet mechanism 38 for controlling the rotation of the spindle 14 is shown in detail. In particular, the spindle 14 is affixed directly to a primary gear 40 with teeth 42 thereon. When handle 16 is moved in the direction of the indicated arrow, a rotation pawl 44, which is spring-biased in a downward direction toward the primary gear 40, engages a tooth 42 of the primary gear 40 to cause the primary gear 40, thus the spindle 14, to rotate in the direction indicated by the arrow about the spindle 14. As a result, the belt 26 is wound a partial turn about the spindle 14. For additional winding, the handle 16 is moved downward in a direction opposite to the direction of the indicated arrow in preparation for additional winding. When the handle 16 is moved downward, the rotation pawl 44 rides over the teeth 42 of the primary gear 40. To prevent unwinding of the spindle, a lock pawl 46, which is spring-biased toward the primary gear 40, is provided which engages with a tooth 42 of the primary gear 40 to prevent rotation of the spindle 14 in an unwinding direction. For a subsequent rotation, the rotation pawl 44 engages another tooth on the primary gear 40 and the lock pawl 46 rides over the teeth 42 until the stroke of the handle 16 is completed.

The handle 16 is cranked until the desired winding and shortening of belt 26 is achieved. While this ratchet mechanism 38 is preferred for the present invention, other ratchet mechanisms may be employed. By way of example and for clarity, the belt 26 is not shown and a spindle is illustrated in FIG. 7 that does not include a spring-biased closure 18.

Figure 8:
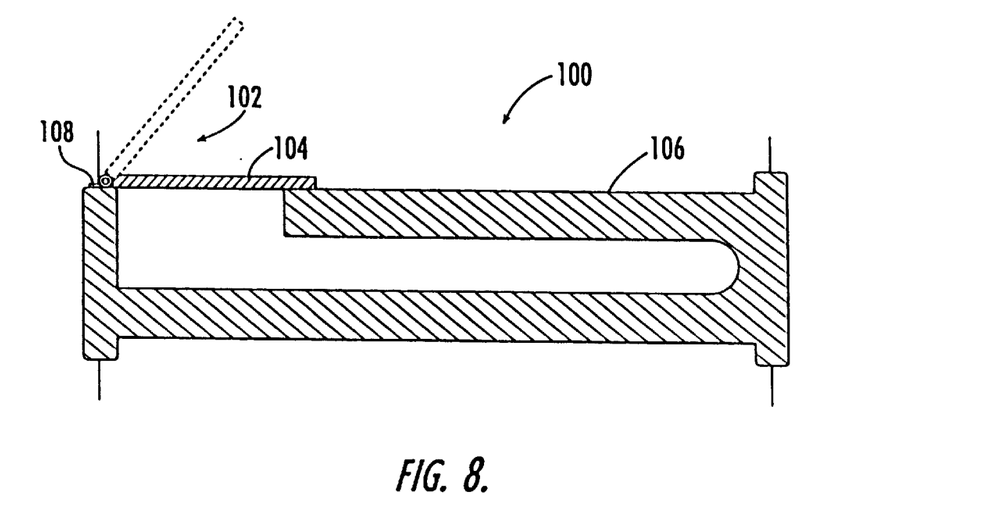
FIG. 8 is a cross-sectional view of an alternative embodiment of the present invention with second alternative spindle closure configuration.

Referring now to FIG. 8, an alternative embodiment 100 of the present invention is shown. In particular, an alternative spring-biased closure 102 configuration is shown to include a hinge mounted door 104 which is spring-biased into a closed position against the spindle 106 by a coil spring 108.

Figure 9:
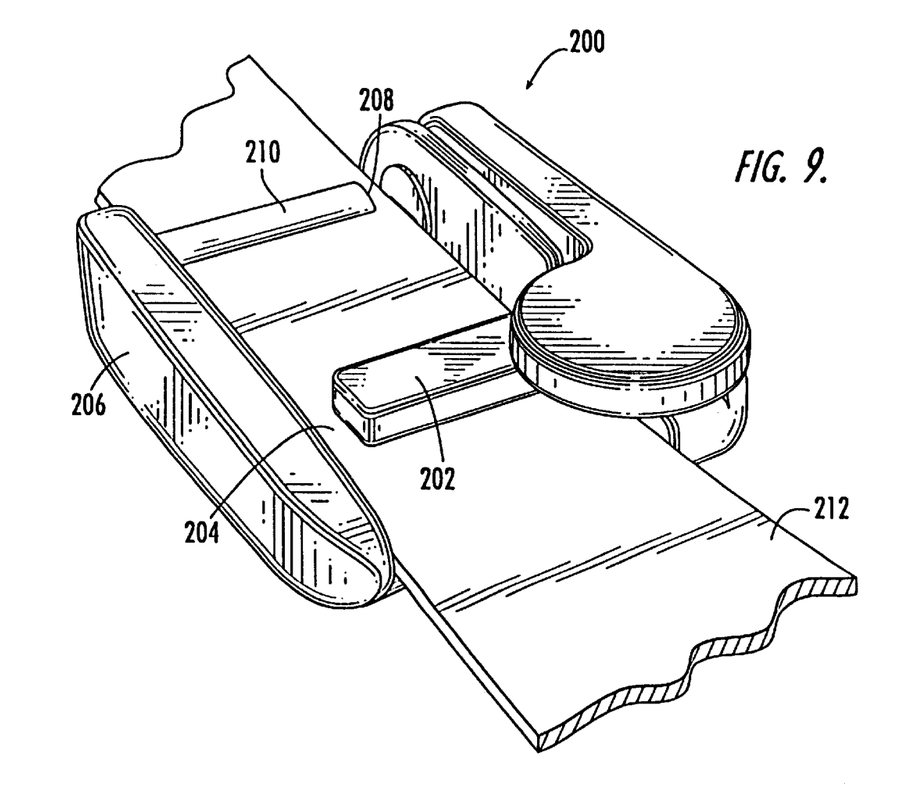
FIG. 9 is a perspective view of an alternative embodiment of the present invention with first alternative spindle configuration and first guide tab configuration with a single guide tab.
Figure 10:
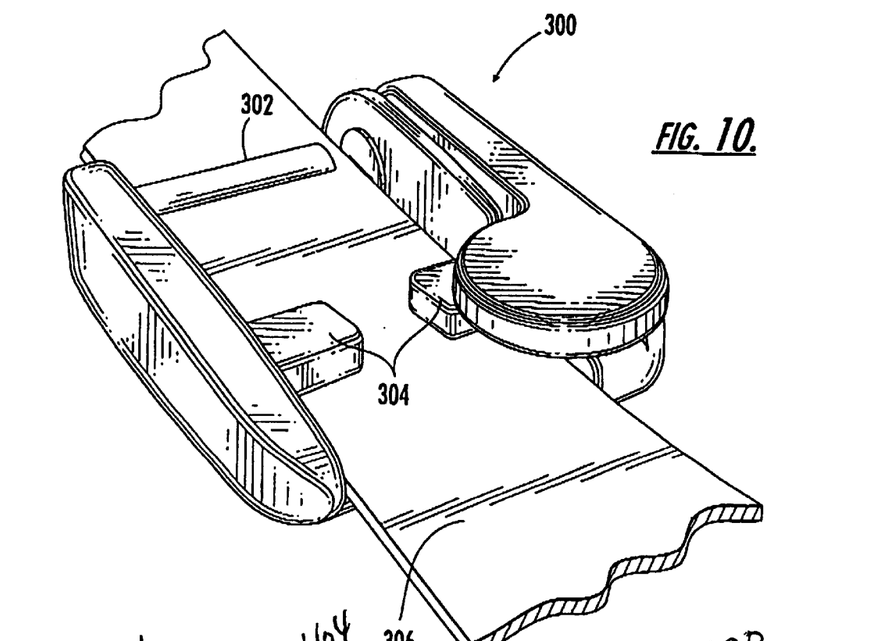
FIG. 10 is a perspective view of a further alternative embodiment of the present invention with first alternative spindle configuration and second guide tab configuration with a pair of guide tabs.

Turning now to FIGS. 9 and 10, two alternative configurations 200 and 300 of the belt shortening device of the present invention is shown. In these embodiments 200 and 300, a spring-biased closure is omitted and, as a result, the lateral entry opening remains open at all times. This open L-slot spindle configuration is physically operable but is dangerous and subject to jamming because it allows for the belt 26 to slide out of the longitudinal slot through the entry opening. To further control the positioning of the belt within the device of the present invention, at least one guide tab is preferred.

In FIG. 9, alternative embodiment 200 includes a single guide tab 202 emanating from one side of the frame to create an entry opening 204 on the opposing side of the device 200. Preferably, the single guide tab 202 emanates from the side of the frame 206 so as to form a guide track entry opening 204 that is cross-corner to the lateral entry opening 208 in the spindle 210. Such cross-corner configuration will make it virtually impossible for the belt 212 to be ejected during use of the device 200. Of course, it is possible to have the guide tab 202 emanate in the opposite direction where the guide track opening 204 is on the same side of the device 200 as the lateral entry opening 208 in the spindle 210. In FIG. 10, a further embodiment 300 is shown where the device 300 includes an L-shaped spindle 302 without a spring-biased closure and including a pair of guide tabs 304. The guide tabs 304 operate as described above in connection with FIGS. 1 and 2 to control belt 306.

Turning now to FIGS. 11–14, alternative embodiments of the present invention are shown to include modifications to the guide tab configurations relative to the spindle. In general, these guide tab configurations provide for different ways to safely secure the belt within the apparatus of the present invention. These alternative embodiments illustrate the various guide tabs configurations within the scope of the present invention. It should be understood that these alternative embodiment operate to shortened a belt as described above in connection with the preferred embodiment; however, the structure for retaining the belt within the apparatus is modified as shown and described below.

Figure 11:
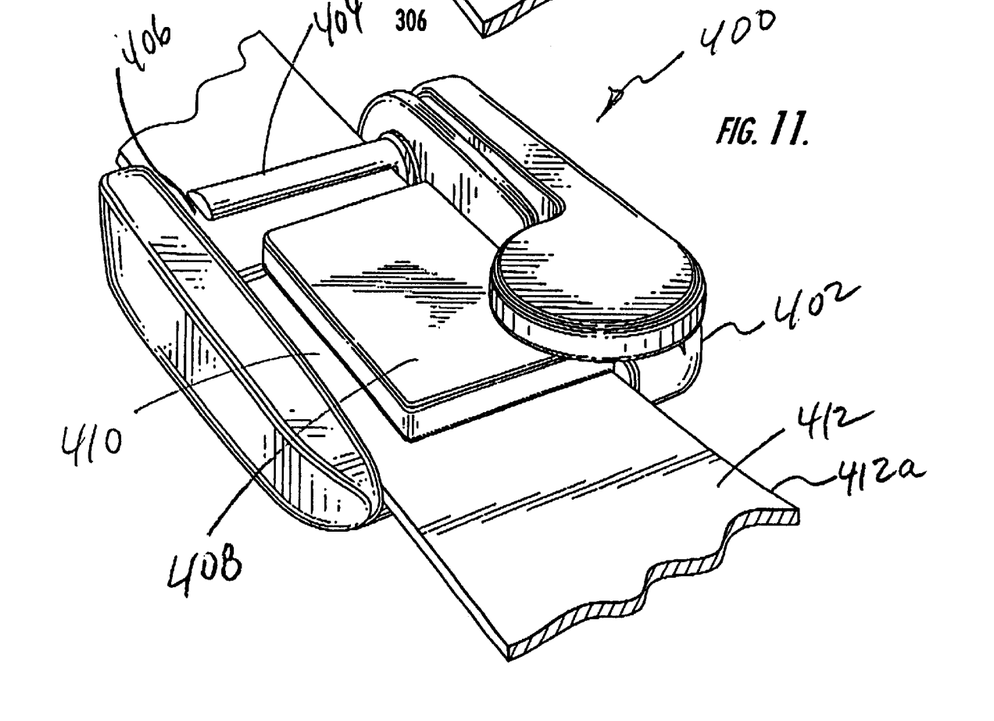
FIG. 11 is a another alternative embodiment of the present invention with a single guide tab running the length of the device with entry opening of the spindle being on the same side as the entry opening of the guide tab.

For example, FIG. 11 shows a belt shortening device 400 with a frame 402 with a rotatable spindle 404 with a spindle entry opening 406 on the left side of the device 400. Similar to FIG. 9 above, a guide tab 408 emanates from the frame 402 leaving a guide tab entry opening 410 for receiving the belt 412 therein. In FIG. 11, the spindle entry opening 406 and the guide tab opening 410 are on the same side of the device 400 as one another thus facilitating the loading a belt 412 into the apparatus 400 for shortening. The belt 412 is loaded into the apparatus 400 by inserting the right edge 412a of the belt 412 first through the spindle entry opening 406 and guide tab entry opening 410. The belt 412 is then slid to reside within the spindle 404 and underneath the guide tab 408. The guide tab 408 is configured to run substantially the entire length of the apparatus 400 thus ensuring that the belt 412 remains safely contained within the apparatus 400 during use of the apparatus 400.

Figure 12:
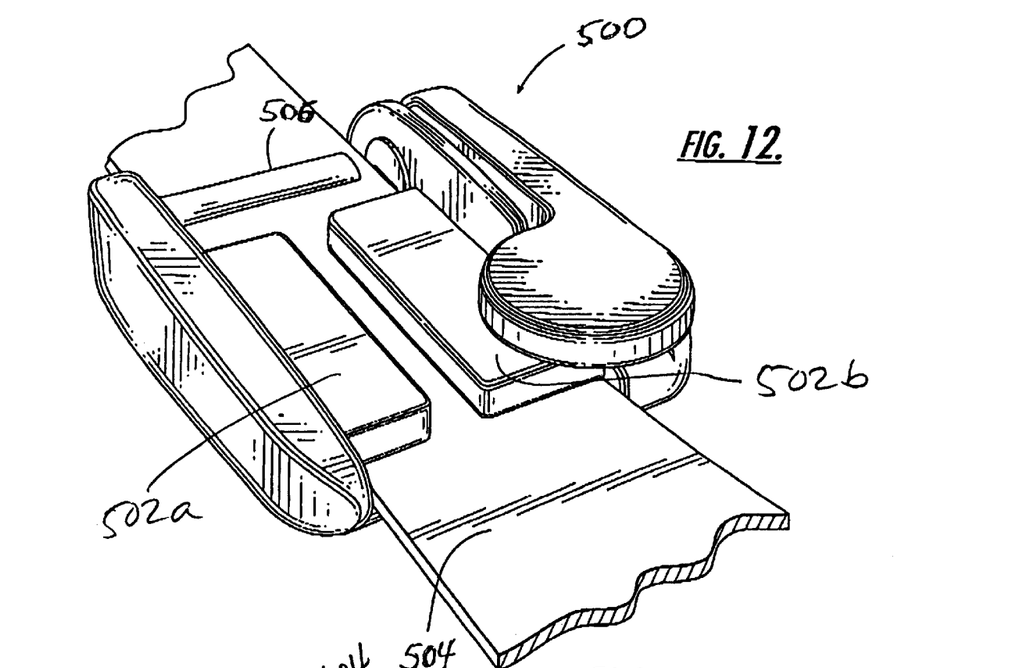
FIG. 12 is yet another alternative embodiment of the present invention with a pair of guide tabs running the length of the device with a central guide tab entry opening.

Turning now to FIG. 12, a further alternative embodiment 500 is shown to provide an apparatus similar to that shown in FIG. 10; however, the guide tabs 502a and 502b are elongated to run the entire length of the apparatus 500 to further improve retention of the belt 504 within the apparatus 500 when routed through spindle 506.

Figure 13:
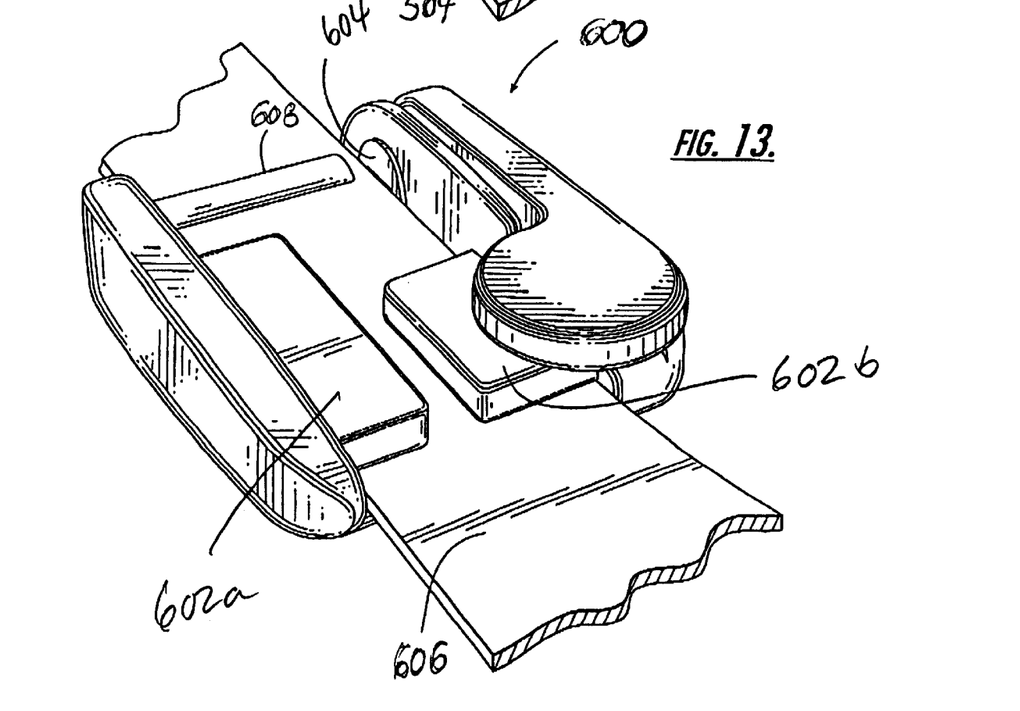
FIG. 13 is another embodiment of the present invention with a pair of guide tabs where the tab on the side of the entry opening to the spindle is shorter than the opposite guide tab.

FIG. 13 provides yet another alternative embodiment 600 which is a further modification to the embodiment of the apparatus 500 shown in FIG. 12. In FIG. 13, the elongated guide tabs 602a and 602b are modified whereby the guide tab 602b on the side of the spindle entry opening 604 is shortened to facilitate the loading of the belt 606 into the apparatus 600. The belt 606 is loaded in similar fashion to that described in connection with FIGS. 10 and 12. The shortened guide tab 602b facilitates routing of the belt 606 into the spindle entry opening 604 of spindle 608.

Figure 14:
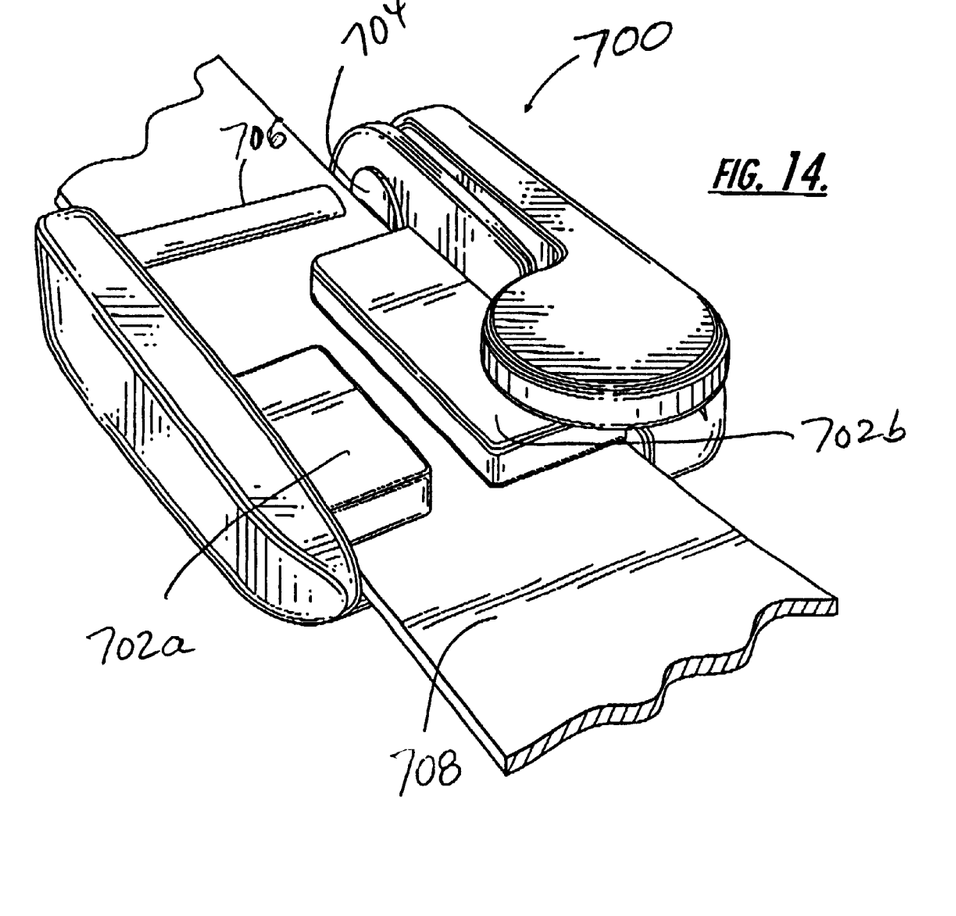
FIG. 14 is another embodiment of the present invention with a pair of guide tabs where the tab on the side of the entry opening of to the spindle is longer than the opposite guide tab.

FIG. 14 illustrates an apparatus 700 which is a further modification to the embodiment 500 shown in FIG. 12. In FIG. 14, the elongated guide tabs 702a and 702b are modified whereby the guide tab 702a on the side opposite to the spindle entry opening 704 of spindle 706 is shortened. The belt 708 is loaded in similar fashion to that described in connection with FIGS. 10 and 12. The shortened guide tab 702a facilitates loading into the guide tabs 702a and 702b while making loading into the spindle 706 more difficult. As a result, the belt 708 will be securely and safely retained with the apparatus 700.

In view of the foregoing, the configuration and arrangement of the guide tabs may be modified to suit the particular application at hand and the dimensions and material of the belt to be wound.

It would be appreciated by those skilled in the art that various changes and modifications can be made to the illustrated embodiments without departing from the spirit of the present invention. All such modifications and changes are intended to be covered by the appended claims.

What is claimed is:

1. A device for shortening a length of a flexible belt having a width and opposing edges, comprising:

a frame having a length;

a spindle supported by said frame for rotation about an axis, said spindle including a longitudinally extending slot, having a length, a width, a first end and a second end opposite said first end, communicating with a laterally extending entry opening having a width, said entry opening being configured and dimensioned to accommodate lateral insertion of said belt into said slot; said laterally extending entry opening being positioned at one end of said slot; said slot and said entry opening, in combination, providing an opening in said spindle of a substantially L-shaped configuration; said spindle being rotatable about said axis in one direction and rotatable in an opposite direction thereto;

a guide tab connected to said frame; said at least one tab being positioned a selected distance from said spindle and being engageable with said belt; said at least one guide tab running substantially the length of said frame and securing said belt during winding of said inserted belt on said spindle; and operating means for rotating said spindle to thereby wind the inserted belt thereon.

2. The device of claim 1, wherein the length of said slot is configured to be greater than the width of said belt.

3. The device of claim 1, wherein the width of said entry opening is less than the width of said slot.

4. The device of claim 1, further comprising ratchet means for accommodating rotation of said spindle in one direction and for resisting rotation of said spindle in the opposite direction.

5. The device of claim 1, wherein said guide tab emanates from a side of said frame to define a guide tab entry opening; said guide tab entry opening being aligned on the same side of said frame as said laterally extending entry opening in said spindle.

6. A device for shortening a length of a flexible belt having a width and opposing edges, comprising:

a frame having a length and opposing sides;

a spindle supported by said frame for rotation about an axis, said spindle including a longitudinally extending slot, having a length, a width, a first end and a second end opposite said first end, communicating with a laterally extending entry opening having a width, said entry opening being configured and dimensioned to accommodate lateral insertion of said belt into said slot; said laterally extending entry opening being positioned at one end of said slot; said slot and said entry opening, in combination, providing an opening in said spindle of a substantially L-shaped configuration; said spindle being rotatable about said axis in one direction and rotatable in an opposite direction thereto;

a pair of tabs connected to said frame and emanating inwardly toward one another from opposing sides of said frame defining an guide tab entry opening therebetween; said pair of tabs being positioned a selected distance from said spindle and being engageable with said belt; said pair of guide tabs running substantially the length of said frame and securing said belt during winding of said inserted belt on said spindle; said pair of guide tabs including a first tab proximal to said laterally extending entry opening and a second guide tab opposite thereto; and operating means for rotating said spindle to thereby wind the inserted belt thereon.

7. The device of claim 6, wherein the length of said slot is configured to be greater than the width of said belt.

8. The device of claim 6, wherein the width of said entry opening is less than the width of said slot.

9. The device of claim 6, further comprising ratchet means for accommodating rotation of said spindle in one direction and for resisting rotation of said spindle in the opposite direction.

10. The device of claim 6, wherein said first tab is positioned farther away from said spindle than said second tab.

11. The device of claim 6, wherein said second tab is positioned farther away from said spindle than said first tab.

* * * * *